United States Patent [19]
Holmes

[11] Patent Number: 5,220,165
[45] Date of Patent: Jun. 15, 1993

[54] RADIATION DETECTION SYSTEM WITH A FOIL MEANS FOR EMITTING RADIANT ENERGY

[75] Inventor: Alan W. Holmes, Santa Barbara, Calif.

[73] Assignee: Santa Barbara Research Center, Goleta, Calif.

[21] Appl. No.: 893,176

[22] Filed: Jun. 3, 1992

[51] Int. Cl.$^5$ ............................................. H01J 5/16
[52] U.S. Cl. ............................ 250/227.11; 250/358.1
[58] Field of Search ..................... 250/227.11, 227.29, 250/213 R, 397, 399, 366, 367, 368, 369, 385.1, 358.1; 359/350; 378/19; 374/32, 121, 161, 131, 132

[56] References Cited
U.S. PATENT DOCUMENTS

| | | | |
|---|---|---|---|
| 4,659,234 | 4/1987 | Brouwer et al. | 374/121 |
| 4,797,555 | 1/1989 | La Mar | 374/161 |

Primary Examiner—David C. Nelms
Assistant Examiner—Que T. Le
Attorney, Agent, or Firm—W. C. Schubert; W. K. Denson-Low

[57] ABSTRACT

A radiation detector capable of withstanding illumination by relatively concentrated electromagnetic energy is disclosed herein. The radiation detection system 10 of the present invention includes a sensor assembly 14 for generating radiant energy upon illumination by incident electromagnetic radiation R. The sensor assembly 14 will preferably include a sheet of metallic foil 24 for emitting the radiant energy into a sensor chamber defined by the assembly 14. The inventive radiation detection system 10 further includes an optical fiber cable 18 in communication with the sensor chamber. Radiant energy from within the sensor chamber is guided by the fiber cable 18 to a shielded detector arrangement 20 disposed to provide a detection signal indicative of the intensity of the incident electromagnetic radiation R.

16 Claims, 2 Drawing Sheets

RADIATION DETECTION SYSTEM WITH A FOIL MEANS FOR EMITTING RADIANT ENERGY

BACKGROUND OF THE INVENTION

1. Field of the Invention

This invention relates to electromagnetic radiation sensors. More specifically, this invention relates to sensors disposed to detect concentrated radiation from high-energy sources.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Many sensitive electronic instruments are vulnerable to damage from exposure to electromagnetic radiation of sufficient intensity. Radiation from high energy lasers, for example, is often sufficient to cause permanent damage to electronic components. Many radiation hardening techniques endeavor to address this threat by detecting high energy radiation levels and activating responsive systems.

Unfortunately, certain difficulties are inherent in the process of monitoring the operational environment of such sensitive instrumentation for the presence of high radiation energy levels. For example, electronic radiation sensors, such as those incorporating photodiodes, may themselves be susceptible to damage from a source of concentrated radiation.

Thermoelectric devices such as thermocouples provide more rugged potential alternatives to sensors which include only electronic components. As is well known, thermocouples include a pair of dissimilar metallic members which interface at a junction. The potential difference across the junction varies as a function of the difference in temperature between the members (e.g. several microvolts per degree Centigrade). Unfortunately, perturbations in the electrical characteristics of the operational environment may impair the accuracy of thermocouples due to the small junction voltage gradient.

In addition, the high thermal mass of thermocouples makes the junction voltage relatively unresponsive to small temperature changes between the constituent members. As is well known, the thermal mass of a thermocouple depends on the ratio between the mass and surface area thereof. Accordingly, thermocouple sensors may be expected to respond relatively slowly to changes in the intensity of incident radiation. On the other hand, thermocouples realized from thin wire are fragile and susceptible to damage when deployed in harsh environments.

Certain types of thermopiles are also potentially suitable for use as radiation detectors. Thermopiles are conventionally employed as temperature measurement devices and generally consist of a number of thermocouples connected in series. In a particular thermopile implementation, thin films of metals (e.g. bismuth or antimony) are deposited on plastic substrates. Again, however, this type of thermopile design is fragile and susceptible to damage from excessive heat.

Accordingly, a need exists in the art for a relatively durable, lightweight radiation detector capable of withstanding exposure to intense radiation.

SUMMARY OF THE INVENTION

The need in the art for a radiation detector capable of withstanding illumination by relatively intense electromagnetic energy is addressed by the radiation detection system of the present invention. The inventive detection system includes a sensor assembly for generating radiant energy upon illumination by incident electromagnetic radiation. The sensor assembly will preferably include a sheet of metallic foil for emitting the radiant energy into a sensor chamber defined by the assembly. The detection system of the present invention further includes an optical fiber cable in communication with the sensor chamber. Radiant energy from within the sensor chamber is then guided by the fiber cable to a shielded detector arrangement. The detector arrangement is disposed to provide a detection signal indicative of the intensity of the incident electromagnetic radiation. The thin foil enables the sensor to respond quickly to changes in incident flux due to its large surface and small thermal mass.

DETAILED DESCRIPTION OF THE INVENTION

Figure 1:
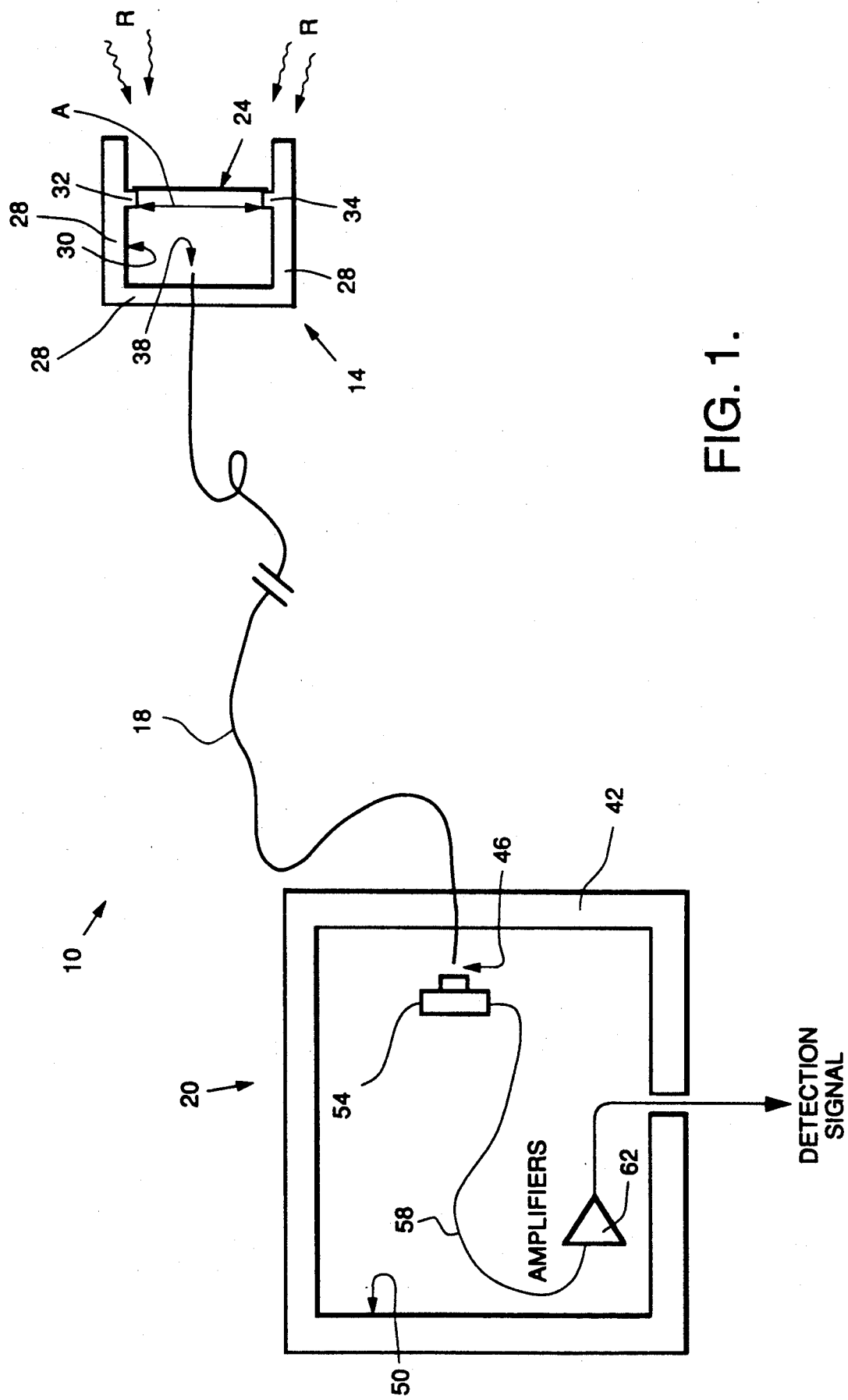
FIG. 1 is an illustrative representation of a preferred embodiment of the radiation detection system of the present invention.

FIG. 1 is an illustrative representation of a preferred embodiment of the radiation detection system 10 of the present invention. The inventive system 10 is operative to generate a detection signal proportional to the intensity of electromagnetic radiation R incident on a sensor assembly 14. In particular, the assembly 14 is disposed to generate optical energy of an intensity proportional to that of the incident radiation R. This optical energy R is then guided by an optical fiber cable 18 to a shielded detection assembly 20. The detection assembly is adapted to synthesize the detection signal in accordance with the intensity of the light energy carried by the fiber cable 18. It is contemplated that the inventive system 10 will be deployed in the vicinity of, for example, sensitive electronic instrumentation susceptible to damage from exposure to high energy radiation. The detection signal may then be monitored to gauge the extent and duration of such exposure.

As is indicated by the cross-sectional representation of the sensor assembly 14 in FIG. 1, a sheet of metallic foil 24 included within the assembly 14 is suspended in the path of the incident radiation R. The radiation R will typically have been emitted by a laser or similar source of concentrated electromagnetic energy. As is described hereinafter, the sensor assembly 14 is responsive to electromagnetic energy of sufficient concentration to induce heating of the foil sheet 24.

Referring to FIG. 1, the sensor assembly 14 includes a sensor housing 28 having an inner surface 30. The inner surface 30 defines an aperture A in which is suspended the metallic foil 24. The sensor housing 28 will preferably be fabricated from a metal (e.g. titanium) able to withstand relatively intense electromagnetic illumination by, for example, a high-energy laser. In addition, the housing 28 includes first and second transverse members 32 and 34 for mounting the foil sheet 24.

In the preferred embodiment of FIG. 1 the foil 24 is affixed to the first and second members 32 and 34 through a plurality of spot welds. The foil 24 will typically be selected to have a thickness on the order of 25 microns, and thus may be welded to the housing 28 by a wire energized by a small capacitive discharge.

As shown in FIG. 1, the inner surface 30 and the foil 24 define a sensor chamber within the sensor assembly 14. During operation of the detection system 10 the foil 24 radiates optical energy into the sensor chamber as a consequence of being heated by the incident radiation R. The foil 24 will thus preferably be fabricated from a relatively low-reflectivity metal such as titanium in order to increase absorption of the incident radiation R. In this way such low-reflectivity foils increase the percentage of incident radiation R emitted into the sensor chamber relative to that emitted by foils fabricated from high-reflectivity metals. Hence, low-reflectivity foil sheets tend to enhance the degree to which the quantity of light energy emitted into the sensor chamber tracks the intensity of the incident radiation R. In addition, the emission of light energy into the sensor chamber by the foil sheet 24 slows the temperature increase thereof in response to illumination by the radiation R. It is thus a feature of the present invention that the sensor assembly 24 is designed to be exposed to intense radiation without incurring damage from excessive heating.

Again referring to FIG. 1, the fiber cable 18 includes a first end 38 positioned to protrude into the sensor chamber. Since it is desired that changes in the intensity of light energy emitted by the foil 24 be accompanied by commensurate variations in the intensity of light carried by the fiber cable 18, the inner housing surface 30 may be coated with an optically reflective material. Such a coating may consist of a material such as gold applied in a conventional manner to the inner housing surface 30.

As may be appreciated from the foregoing, the inclusion of the foil sheet 24 within the sensor assembly 14 allows the present invention to be sensitive to nearly all varieties of electromagnetic illumination. That is, the foil 24 is heated as a consequence of exposure to virtually all wavelengths of electromagnetic radiation irrespective of the mode of transmission. (i.e. pulsed or continuous-beam). Similarly, as the foil 24 undergoes an increase in temperature due to absorption of the radiation R the average wavelength of optical energy emitted into the sensor chamber will tend to decrease. Nonetheless, foils fabricated from materials such as titanium and the nickel alloys tend to radiate substantial quantities of optical energy at visible wavelengths upon being heated. Accordingly, silica optical fibers operative to efficiently guide visible light energy at wavelengths extending from approximately 0.6 to 1.0 microns may be used to realize the fiber cable 18.

Referring again to FIG. 1, the fiber cable 18 extends through an aperture (not shown) in the sensor housing 28 and into the sensor chamber. The cable 18 will typically be bonded to the housing 28 with a heat-resistant ceramic. Again, optical energy from within the sensor chamber collected by the first end 38 of the fiber cable 18 is guided thereby to the detector assembly 20. The detector assembly 20 includes a shielded detector housing 42 through which is threaded the fiber cable 18. A second end 46 of the cable 18 protrudes into a detection chamber defined by an inner surface 50 of the detector housing 42. The detector assembly 20 includes a photodetector 54 conventionally mounted within the detector chamber. The shielded housing will be constructed from a metal or other material capable of preventing the incident radiation from impinging upon the photodetector 54.

As shown in FIG. 1, the photodetector 54 is positioned in optical alignment with the second end 46 of the fiber cable 18 so as to be illuminated by optical energy originating within the sensor chamber. It follows that the magnitude of a first voltage impressed by the photodetector 54 upon a first signal line 58 is proportional to the intensity of the incident radiation R. The detector assembly 20 further includes an amplifier 62 disposed to provide a detection signal having a magnitude proportional to that of the first voltage.

In an alternately preferred embodiment of the present invention a plurality of the detection systems depicted in FIG. 1 could be employed in a detection array. Such an array would preferably include a plurality of sensor assemblies each linked to a separate photodetector via an optical fiber cable as described above. The array of photodetectors could, for example, be included within a single shielded detection assembly. In this manner the electrical output of each photodetector would be indicative of the radiation intensity impinging on an associated sensor assembly.

Figure 2:
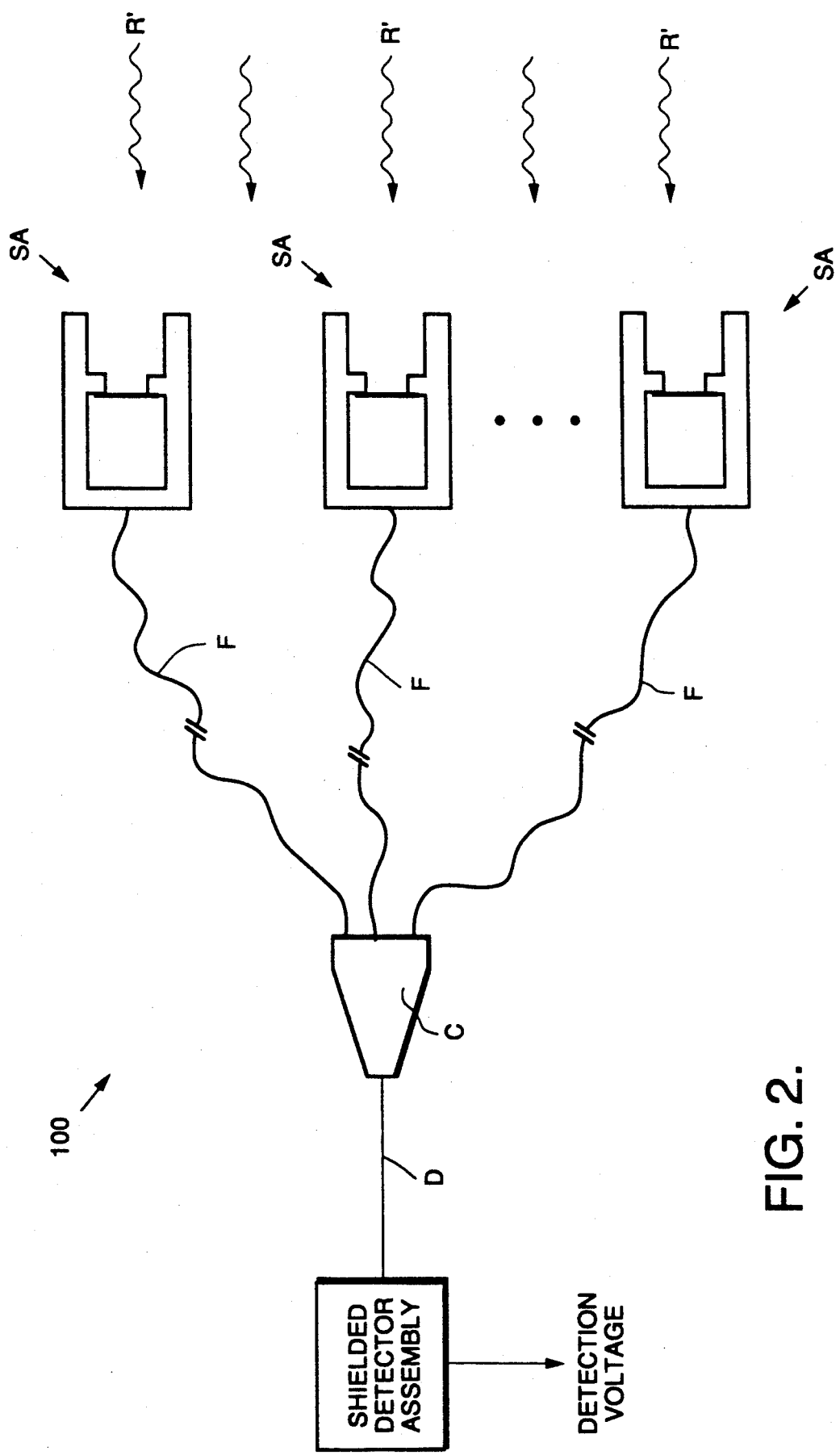
FIG. 2 shows a block diagrammatic representation of an alternately preferred embodiment of the radiation detection array of the present invention

FIG. 2 shows a block diagrammatic representation of an alternately preferred embodiment of the radiation detection array 100 of the present invention. The inventive array 100 includes a plurality of sensor assemblies (SA) deployed so as to be illuminated by incident radiation R'. Each of the sensor assemblies depicted in FIG. 2 are substantially identical to the sensor assembly 14 (FIG. 1). As shown in FIG. 2, the sensor assemblies SA are each joined by an optical fiber cable F to an optical combiner C. The combiner C creates an optical path between each of the fiber cables F and an optical fiber detection cable D. The detection cable D protrudes into a detection chamber within a shielded detector assembly. The detector assembly is substantially identical to the detector assembly 20 (FIG. 1), and thus includes a photodetector (not shown) mounted within the detection chamber in optical alignment with an end of the detection cable D. Accordingly, the electrical output of the photodetector is indicative of the aggregate illumination of the sensor assemblies SA by the radiation R'.

While the present invention has been described herein with reference to a particular embodiment, it is understood that the invention is not limited thereto. The teachings of this invention may be utilized by one having ordinary skill in the art to make modifications within the scope thereof. In this regard the invention is not limited to the particular implementation of the sensor assembly given herein. For example, there may exist sheets of non-metallic material which upon being heated emit light energy in a manner substantially similar to that described herein with reference to the sheets of metallic foil. The invention is similarly not limited to the detection of incident electromagnetic energy within a specific spectral band. As noted above, the foil sheet suspended within each sensor assembly is disposed to release optical energy in response to illumination by electromagnetic radiation transmitted in virtually any format.

Although in the preferred embodiments discussed herein the photodetector is enclosed within a detection chamber, other open-ended structures providing suitable shielding from extraneous electromagnetic energy may be substituted therefor.

It is therefore contemplated by the appended claims to cover any and all such modifications.

Accordingly,

What is claimed is:

1. A radiation detection system comprising:
    a sensor assembly, said sensor assembly including foil means for generating radiant energy upon illumination by incident electromagnetic radiation;
    fiber cable means for guiding at least a portion of said radiant energy; and
    shielded detector means for providing a detection signal in response to said guided radiant energy.

2. The radiation detection system of claim 1 wherein said foil means includes a sheet of metallic foil positioned in the path of said incident electromagnetic radiation.

3. The radiation detection system of claim 2 wherein said sensor means includes a sensor housing and wherein said foil sheet is suspended across an aperture defined by said housing.

4. The radiation detection system of claim 3 wherein said foil sheet is disposed to emit said radiant energy into a sensor chamber bounded by said sensor housing and said foil sheet.

5. The radiation detection system of claim 4 wherein said fiber cable means includes an optical fiber having first and second ends, said first end being in communication with said sensor chamber.

6. The radiation detection system of claim 5 wherein said shielded detector means includes a photodetector positioned in optical alignment with said second end of said optical fiber.

7. The radiation detection system of claim 6 wherein said detector means includes radiation shield means for isolating said photodetector from said incident electromagnetic radiation.

8. The radiation detection system of claim 7 wherein said radiation shield means includes a detector housing, said housing defining a detection chamber for enclosing said photodetector.

9. The radiation detection system of claim 8 wherein said second end of said optical fiber is in communication with said detection chamber.

10. A system for detecting a beam of high-energy radiation comprising:
    a sheet of metallic foil having interior and exterior surfaces wherein said interior surface of said foil is disposed to emit light energy in response to the incidence of said beam upon said exterior surface;
    an optical fiber having first and second ends, said optical fiber being positioned such that said first fiber end is illuminated by said light energy;
    shielded photodetector means for generating a detection signal in response to light energy guided by said optical fiber.

11. The system of claim 10 wherein said shielded photodetector means includes a photodetector positioned in optical alignment with said second end of said optical fiber.

12. The system of claim 11 further including a sensor housing, said foil sheet being suspended across an aperture defined by said housing so as to bound a sensor chamber.

13. The system of claim 12 wherein said shielded photodetector means includes a detector housing for shielding said photodetector from said incident electromagnetic energy.

14. A radiation detection array comprising:
    a sensor array, said array including a plurality of sensor assemblies wherein each of said assemblies includes foil means for generating radiant energy upon illumination by incident electromagnetic radiation;
    a plurality of optical fiber cables for guiding said radiant energy generated by said sensor assemblies; and
    shielded detector means for providing a detection signal in response to said guided radiant energy.

15. The detection array of claim 14 wherein each of said foil means includes a sheet of metallic foil suspended in the path of said incident radiation.

16. The detection array of claim 15 wherein said shielded detector means includes a plurality of photodetectors and wherein each of said photodetectors is positioned so as to be in optical communication with one of said fiber cables.

* * * * *